Figure 1:
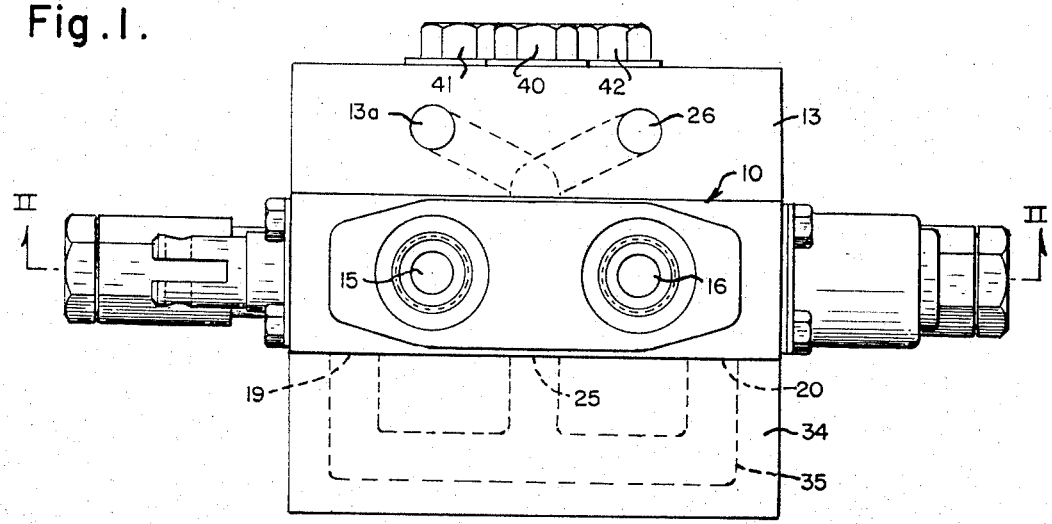

Dec. 3, 1968  R. F. HODGSON  3,414,017

FLUID CONTROL VALVES

Filed Sept. 6, 1966  2 Sheets-Sheet 1

INVENTOR
Robert F. Hodgson

United States Patent Office 3,414,017
Patented Dec. 3, 1968

1

3,414,017
FLUID CONTROL VALVES
Robert F. Hodgson, Canfield, Ohio, assignor to Commercial Shearing & Stamping Company, a corporation of Ohio
Filed Sept. 6, 1966, Ser. No. 577,279
9 Claims. (Cl. 137—596.2)

This invention relates to fluid control valves and particularly to control valves for high pressure hydraulic systems such as are used on earth moving machinery and the like. This invention is primarily directed to a new closed center valve for use in such hydraulic system.

Closed center valves have been heretofore proposed for use in hydraulic systems because of the advantages to be derived from the use of a constant pressure source of fluid in conjunction with a static column of fluid in the valve itself. Such valves have, however, not met with success because of the serious disadvantages which also result from the presence of a high pressure fluid load on the center of the valve in the static condition. The principal disadvantage of this type of value is the bleed-by of high pressure fluid from the input column to the cylinder causing uncontrolled cylinder drift. This is highly undesirable, particularly in earth moving machinery.

I have invented a closed center fluid valve which entirely eliminates this problem of cylinder drift. While the invention has application in various valve configurations, I shall illustrate and describe it primarily in connection with a double acting valve. In a preferred embodiment, I provide an elongated housing having spaced parallel bores extending lengthwise therethrough, a high pressure inlet in said housing adapted to be connected to a source of high pressure fluid, said inlet communicating with one of said bores intermediate its ends, a low pressure exhaust chamber spaced from said inlet communicating with both bores, a high pressure cylinder chamber intermediate the inlet and the exhaust chamber and communicating with both bores, a spool axially movable in said one bore, said spool being hollow along its axis at each end, spaced ports in said spool at each end communicating with the hollow axis, said ports being spaced so that in a neutral position of the spool at least one of the spaced ports at each end of the spool communicates with an exhaust chamber and the other lies adjacent the inlet and within the bore intercepting any fluid leakage along the bore whereby bleed-by fluid from the inlet is relieved into the center of the spool and out to the exhaust chambers and in one working position one group of ports and their associated hollow axis connects the inlet and one cylinder chamber and a normally closed pressure responsive valve in said other bore between each cylinder chamber and the adjacent exhaust chamber. Preferably the pressure responsive valves are spring loaded adjustable relief valves adapted to relieve fluid from the cylinder chamber to the exhaust chamber at a pressure just exceeding the load pressure on the cylinder chamber. Preferably, a low pressure outlet extends parallel to the inlet and communicating with said other bore intermediate its ends and separated from each of the cylinder and exhaust chambers by a normally closed pressure differential responsive valve.

Figure 2:
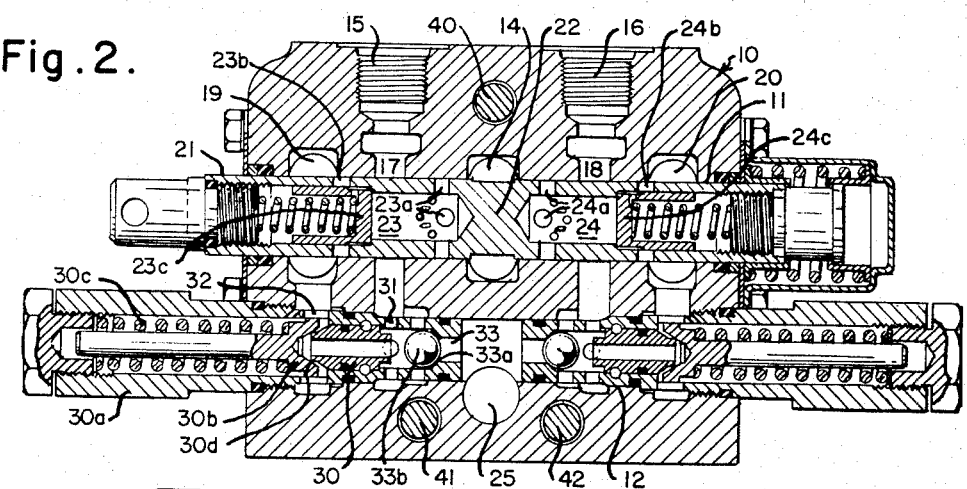
Figure 3:
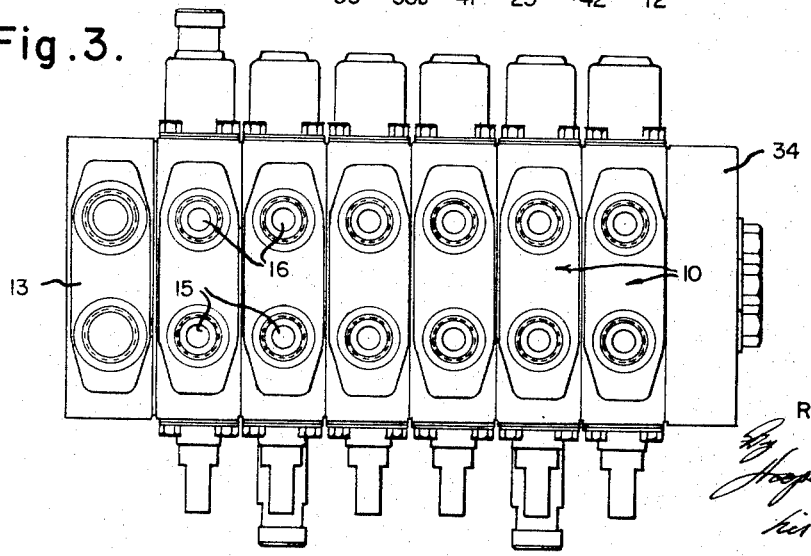
Figure 4:
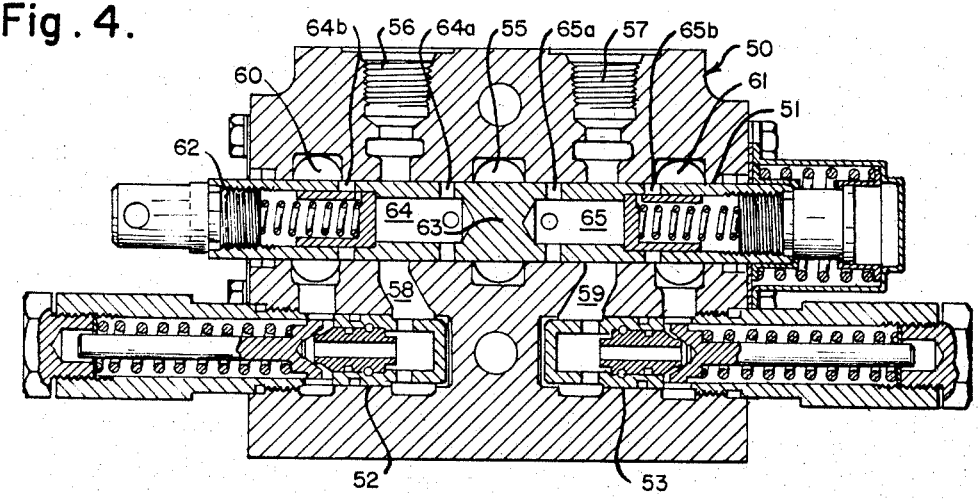
Figure 5:
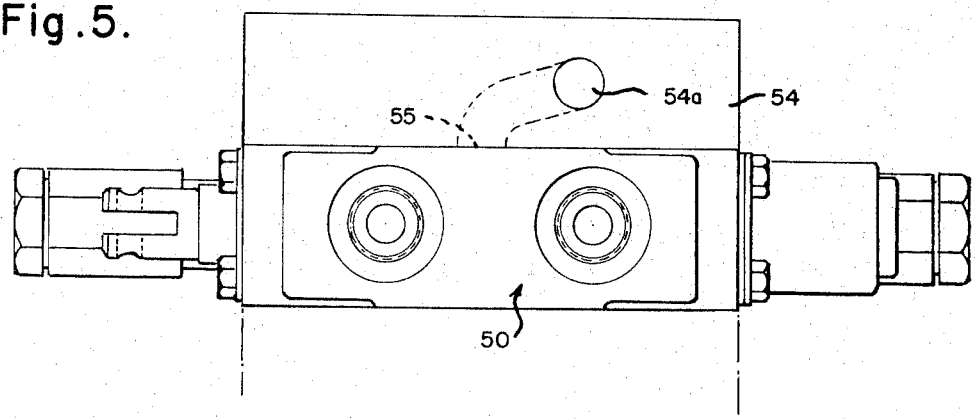

In the foregoing general disclosure, I have set out certain objects, purposes and advantages of my invention. Other objects, purposes and advantages of my invention will be apparent for a consideration of the following description and the accompanying drawings in which:

FIGURE 1 is a top plan view of a double acting valve according to my invention;
FIGURE 2 is a section on the line II—II of FIGURE 1;
FIGURE 3 is a top plan view of a multi sectional valve according to my invention;
FIGURE 4 is a longitudinal section of a second embodiment of my invention incorporated in a double acting valve; and
FIGURE 5 is a top plan view of the value of FIGURE 4.

Referring to the drawings, I have illustrated a double acting valve housing 10 having spaced apart parallel lengthwise bores 11 and 12 extending therethrough. An inlet section 13 having inlet port 13a adapted to be connected to a source of constant high pressure fluid communicates with bore 11 through inlet center passage 14. Cylinder ports 15 and 16 connect to cylinder chambers 17 and 18 respectively which intersect both bores 11 and 12, one on either side of inlet passage 14. Exhaust chambers 19 and 20, one adjacent each cylinder chamber 17 and 18, intersect both bores 11 and 12. An axially movable spool 21 moves in bore 11. This spool is provided with a solid center portion 22 and hollow axial end bores 23 and 24 at each end. Each end bore 23 and 24 is provided with a pair of spaced apart groups of ports 23a and 23b and 24a and 24b respectively spaced so that in the neutral position (FIGURE 2) one group of ports 23a and 24a of each pair is closed. In one work position with the spool moved to the right, viewing FIGURE 2, one pair of ports 23a and 23b connect the center passage 14 with cylinder chamber 17 and the other pair 24a and 24b connect the cylinder chamber 18 with adjacent exhaust passage 20. In the other work position, with the spool moved to the left, viewing FIGURE 2, the pair of ports 24a and 24b connect the inlet passage 14 with cylinder chamber 18 and the pair 23a and 23b connect cylinder chamber 17 and adjacent exhaust chamber 19. Each end bore 23 and 24 is provided with spring loaded check valves 23c and 24c between ports 23a and 23b and 24a and 24b respectively to prevent any return flow from the cylinder chambers 17 and 18 to the inlet center passage 14. The bore 12 connects with a transverse low pressure passage 25 which connects to a fluid tank or reservoir through outlet port 26. Bore 12 is provided at each end with relief valve assemblies 30, made up of a hollow housing 30a with a pilot valve 30b urged by spring 30c against seat 30d. Openings 31 communicate from the cylinder chamber 17 or 18 into the interior of housing 30c as the case may be. Openings 32 communicate from exhaust chamber 19 or 20 to the interior of housing 30c. Passage 33 communicates from bore 12 to the interior of housing 30c and is provided with a seat 33a closed by ball 33b. End cap 34 provided with passage 35 closes chamber 14 and connects exhaust chambers 19 and 20 with the low pressure tank line 25.

In the operation of the valve, high pressure fluid from a source is introduced into inlet 13 to passage 14. In the neutral position of the spool 21 shown in FIGURE 2, no flow of fluid occurs. The fluid in passage 14 being at high pressure (about 3,000 p.s.i.) tends to bleed by the spool into cylinder chambers 17 and 18. This normally causes drift of the work cylinder operated out of chambers 17 and 18, however, in the valve of this invention, ports 23a and 24 lie within the bore on each side of chamber 14 intercepting the bleed-by and delivering it into the passages 23 and 24 from which the bleed-by fluid is relieved into the adjacent exhaust chambers 19 and 20 respectively through the check valves 23c and 24c and openings 23b and 24b respectively and thence to low pressure passage 25 and to the reservoir.

In the valve of this invention a tendency to cavitate is prevented by the connection formed by passage 33 and ball 33b. When a vacuum occurs in either cylinder chamber 17 or 18, fluid is drawn from low pressure line 25 through passage 33, past ball 33b through openings 35 into the cylinder chamber.

In the valve of FIGURES 1 and 2, I have illustrated a separate inlet section 13, working section 10, and end cap 34 held together by bolts 40, 41, and 42, however, the inlet section, working section and end cap could be a single system if desired.

Multi-section valves are assembled as in FIGURE 3, each section, having a housing 10 with two spaced parallel bores 11 and 12 as described above. Each complete valve assembly is provided with an inlet section 13 and an end cap 34 as in FIGURE 1.

Referring to FIGURE 4, I have illustrated a second embodiment of my invention in which I provide a housing 50 having a lengthwise bore 51 extending through the housing and two spaced parallel bores 52 and 53 on the same axis, one at each end of the housing. An inlet section 54 having inlet port 54a adapated to be connected to a source of high pressure fluid communicates with bore 51 through inlet passage 55. Cylinder ports 56 and 57 connect to cylinder chambers 58 and 59 respectively. Chamber 58 intersects main bore 51 and bore 52 and chamber 59 intersects main bore 51 and bore 53. Exhaust chambers 60 and 61, one adjacent each cylinder chamber 58 and 59 intersect the main bore 51 and the one of bores 52 and 53 intersected by the adjacent cylinder chamber. An axially movable spool 62 identical with spool 21 moves in bore 51. The spool is provided with a solid center portion 63 and hollow end bores 64 and 65. Each end bore is provided with a pair of spaced apart ports 64a and 64b and 65a and 65b respectively spaced so that in the neutral position one group of ports 64a and 65a of each part is closed. In one work position with spool moved to the right, viewing FIGURE 4, one pair of ports 64a and 64b connect the center passage 55 with cylinder chamber 58 and the other pair 65a and 65b connect the cylinder chamber 59 with adjacent exhaust chamber 71. In the other work position with the spool moved to the left, viewing FIGURE 4, the pair of ports 65a and 65b connect inlet passage 55 with cylinder chamber 59 and ports 64a and 64b connect cylinder chamber 58 and adjacent exhaust chamber 60.

While I have illustrated and described my invention in connection with an ordinary double acting valve, the invention may be used in various modified double acting valves including regenerative and float-type valves.

In the foregoing specification, I have illustrated and described certain preferred embodiments of my invention however, it will be understood that this invention may be otherwise embodied with the scope of the following claims.

I claim:

1. A fluid pressure valve comprising a housing, a main bore extending lengthwise through said housing, at least one spaced parallel bore in said housing parallel to the main bore, a high pressure inlet in said housing adapted to be connected to a source of high pressure fluid, said inlet communicating with said main bore intermediate its ends, a low pressure exhaust chamber spaced from said inlet communicating with both bores, a high pressure cylinder chamber intermediate the inlet and the exhaust chamber and communicating with both bores, a spool axially movable in said main bore, said spool being hollow along its axis at each end, spaced ports in said spool at each end communicating with the hollow axis, said ports being spaced so that in a neutral position at least one of the spaced ports at each end of the spool communicates with an exhaust chamber and the other port lies adjacent the inlet and within the bore intercepting any fluid leakage along the bore whereby bleed-by fluid from the inlet is relieved into the center of the spool and to the exhaust chamber through said spaced ports, in one working position one group of ports and their associated hollow axis connects the inlet and one cylinder chamber and a normally closed pressure responsive valve in said other bore between said cylinder chamber and the adjacent exhaust chamber.

2. A fluid pressure valve as claimed in claim 1 wherein a low pressure exhaust chamber is spaced from said inlet on each side thereof intersecting both bores, a high pressure cylinder chamber is positioned between each exhaust chamber and the inlet and intersecting both bores and the spool is hollow along its axis at each end terminating in a solid center portion and is provided with a pair of axially spaced ports at each end communicating from the outer periphery of the spool into the hollow axis, said ports being spaced so that in a neutral position at least one of each pair of ports is closed, in one work position one pair of ports communicates from the inlet to one high pressure cylinder through the hollow axis at one end of the spool while the other pair of ports communicates through the hollow axis at the other end of the spool between the other cylinder chamber and an adjacent outlet chamber and in a second work position said other pair of ports connects the inlet with the said other cylinder chamber and said one pair of ports connects the said one high pressure cylinder chamber with an adjacent outlet chamber and a normally closed pressure responsive valve is provided in said other bore between each cylinder chamber and the adjacent exhaust chamber.

3. A fluid pressure valve as claimed in claim 1 wherein a tank return line connects the outlet chambers and said other bore intermediate its ends.

4. A fluid pressure valve as claimed in claim 3 wherein a differential pressure responsive valve communicates between the return line and the cylinder chamber.

5. A fluid pressure valve as claimed in claim 2 wherein a tank return line connects the exhaust chambers and the said other bore intermediate its ends.

6. A fluid pressure valve as claimed in claim 5 wherein a differential pressure responsive valve communicates between the return line and each cylinder chamber.

7. A fluid pressure valve comprising an inlet section, a plurality of side-by-side elongated housings, spaced parallel bores extending lengthwise through each said housing, a high pressure chamber in each said housing adapted to be connected to a source of high pressure fluid through said inlet section, said inlet chamber communicating with one of said bores intermediate its ends, a low pressure exhaust chamber in each housing spaced from said inlet communicating with both bores, a high pressure cylinder chamber in each housing intermediate the inlet and the exhaust chamber and communicating with both bores, a spool axially movable in said one bore, said spool being hollow along its axis at each end, spaced ports in said spool at each end communicating with the hollow axis, said ports being spaced so that in a neutral position at least one of the spaced ports at each end of the spool communicates with an exhaust chamber and the other port lies adjacent the inlet and within the bore intercepting any fluid leakage along the bore whereby bleed-by fluid from the inlet is relieved into the center of the spool and to the exhaust chamber through said spaced ports, in one working position one group of ports and their associated hollow axis connects the inlet and one cylinder chamber, a normally closed pressure responsive valve in said other bore between said cylinder chamber and the adjacent exhaust chamber in each said housing and end cap means closing the inlet chambers and connecting the exhaust chambers with a low pressure return line extending transversely through said side-by-side housing.

8. A fluid pressure valve as claimed in claim 7 wherein the inlet section, each elongated housing and the end cap are separate members connected together by transversely extending spaced bolts passing therethrough.

9. A fluid pressure valve as claimed in claim 7 wherein the inlet section, the plurality of housings and end cap are an integral unit.

References Cited

UNITED STATES PATENTS

| | | | |
|---|---|---|---|
| 2,359,802 | 10/1944 | Stephens | 137—625.68 XR |
| 2,651,324 | 9/1953 | Hodgson et al. | 137—625.68 XR |
| 3,215,160 | 11/1965 | Rice | 137—625.68 XR |
| 3,255,777 | 6/1966 | Rice et al. | 137—625.68 |
| 3,353,556 | 11/1967 | Hodgson | 137—596.12 |

M. CARY NELSON, *Primary Examiner.*